(12) United States Patent
Attanasio et al.

(10) Patent No.: US 8,359,369 B2
(45) Date of Patent: *Jan. 22, 2013

(54) DYNAMICALLY OPTIMIZING DELIVERY OF MULTIMEDIA CONTENT OVER A NETWORK

(75) Inventors: Luisa Attanasio, Moliterno (IT); Giancarlo Carbone, Rome (IT); Giuseppe Ciano, Rome (IT); Francesco Lecciso, Rome (IT); Luigi Pichetti, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,956

(22) Filed: Feb. 2, 2012

(65) Prior Publication Data

US 2012/0143988 A1     Jun. 7, 2012

Related U.S. Application Data

(63) Continuation of application No. 12/401,782, filed on Mar. 11, 2009.

(51) Int. Cl.
  *G06F 15/16* (2006.01)
  *G06F 3/00* (2006.01)
  *H04M 3/42* (2006.01)
(52) U.S. Cl. ........ 709/217; 709/218; 709/219; 709/223; 709/224; 709/225; 709/226; 709/227; 709/228; 709/229; 709/240; 725/117; 725/119; 725/131; 455/414.1; 370/352; 370/522; 379/88.17; 379/207.02; 710/15; 710/16; 710/17; 710/18; 710/19
(58) Field of Classification Search .......... 709/223–229, 709/240, 217, 218, 219; 725/117, 119, 131; 455/414.1; 370/352, 522; 379/88.17, 207.02; 710/15–19

See application file for complete search history.

(56) References Cited

U.S. PATENT DOCUMENTS

| | | | | |
|---|---|---|---|---|
| 5,859,979 | A * | 1/1999 | Tung et al. | 709/228 |
| 6,230,200 | B1 | 5/2001 | Forecast et al. | |
| 6,354,748 | B1 * | 3/2002 | Vrvilo | 709/204 |
| 7,136,651 | B2 | 11/2006 | Kalavade | |
| 7,139,797 | B1 * | 11/2006 | Yoakum et al. | 709/204 |
| 7,283,519 | B2 | 10/2007 | Girard | |

(Continued)

OTHER PUBLICATIONS

"U.S. Appl. No. 12/120,845 Office Action", Nov. 30, 2010, 21pages.

(Continued)

*Primary Examiner* — John Follansbee
*Assistant Examiner* — Saket K Daftuar
(74) *Attorney, Agent, or Firm* — Delizio Gilliam, PLLC (57) ABSTRACT

A method includes connecting a communications device to an Internet Multimedia Subsystem network. The method includes transmitting presence information indicating multimedia capabilities of the communications device and requesting multimedia content from a multimedia server to cause the multimedia server to transmit multimedia content. The method includes detecting connection of a peripheral device to the communications device and determining that the multimedia capabilities have increased due to the connection of the peripheral device. The method includes updating the presence information to indicate the increased multimedia capabilities and transmitting the updated presence information to cause the multimedia server to transmit the multimedia content adjusted for the increased multimedia capabilities indicated in the updated presence information. The method includes receiving the multimedia content adjusted for the increased multimedia capabilities and presenting at least some of the adjusted multimedia content on the peripheral device.

20 Claims, 4 Drawing Sheets

U.S. PATENT DOCUMENTS

| | | | |
|---|---|---|---|
| 7,353,278 B2 | 4/2008 | Tuunanen et al. | |
| 7,403,607 B2 | 7/2008 | Hession et al. | |
| 7,467,231 B2 * | 12/2008 | Kegoya et al. | 709/246 |
| 7,694,127 B2 | 4/2010 | Adams et al. | |
| 8,001,210 B2 * | 8/2011 | Minagawa et al. | 709/217 |
| 8,060,659 B2 * | 11/2011 | Ichieda | 710/5 |
| 2002/0176404 A1 | 11/2002 | Girard | |
| 2003/0154282 A1 | 8/2003 | Horvitz | |
| 2004/0010588 A1 * | 1/2004 | Slater et al. | 709/224 |
| 2004/0214551 A1 | 10/2004 | Kim | |
| 2006/0026513 A1 * | 2/2006 | Eschbach et al. | 715/526 |
| 2006/0190615 A1 * | 8/2006 | Panwar et al. | 709/231 |
| 2006/0222246 A1 * | 10/2006 | Murai et al. | 382/232 |
| 2006/0277497 A1 * | 12/2006 | Minagawa et al. | 715/819 |
| 2007/0005795 A1 * | 1/2007 | Gonzalez | 709/232 |
| 2007/0074097 A1 | 3/2007 | Laksono | |
| 2007/0110443 A1 | 5/2007 | Kim et al. | |
| 2007/0297339 A1 | 12/2007 | Taylor et al. | |
| 2008/0005668 A1 * | 1/2008 | Mavinkurve et al. | 715/526 |
| 2008/0194231 A1 | 8/2008 | Kim et al. | |
| 2008/0207182 A1 * | 8/2008 | Maharajh et al. | 455/414.1 |
| 2008/0250238 A1 | 10/2008 | Risan et al. | |
| 2008/0282083 A1 * | 11/2008 | Risan et al. | 713/153 |
| 2009/0037524 A1 * | 2/2009 | O'Rourke et al. | 709/203 |
| 2010/0063989 A1 * | 3/2010 | Mehta et al. | 709/202 |
| 2010/0121977 A1 * | 5/2010 | Kontola et al. | 709/232 |
| 2010/0146075 A1 * | 6/2010 | Helaine et al. | 709/219 |
| 2010/0188982 A1 * | 7/2010 | Kato et al. | 370/242 |
| 2010/0235520 A1 | 9/2010 | Attanasio et al. | |

OTHER PUBLICATIONS

"U.S. Appl. No. 12/401,782 Final Office Action", May 12, 2011, 26 pages.

Izumikawa, Haruki et al., "SIP-based Bicasting for Seamless Handover between Heterogeneous Networks", http://tools.ietf.org/wg/sipping/draft-izumikawa-sipping-sipbicast-00.txt Nov. 9, 2007.

* cited by examiner

DYNAMICALLY OPTIMIZING DELIVERY OF MULTIMEDIA CONTENT OVER A NETWORK

CROSS-REFERENCE TO RELATED APPLICATION

This application is a continuation of U.S. patent application Ser. No. 12/401,782, entitled DYNAMICALLY OPTIMIZING DELIVERY OF MULTIMEDIA CONTENT OVER A NETWORK, filed Mar. 11, 2009, now allowed.

BACKGROUND

Embodiments of the inventive subject matter generally relate to the field of networking, and, more particularly, to dynamically optimizing delivery of multimedia content over a network.

Internet Multimedia Subsystem (IMS) is a set of specifications for implementing internet protocol (IP) based telephony and multimedia services over a network. IMS often uses Internet Engineering Task Force (IETF) protocols such as Session Initiation Protocol (SIP). IMS networks utilize presence servers to store presence information of network users. Presence information indicates a user's communication devices (e.g., a laptop, a mobile phone, etc.) and capabilities of the devices (e.g., audio quality, video quality, instant messaging, etc.). Multimedia servers use presence information to optimize delivery of multimedia content to users. For example, if a user is able to receive audio content on a low fidelity device, it is not appropriate for a multimedia server to deliver a high quality audio stream. As another example, a user is able to receive video content on both a mobile phone and a laptop. The user initiates a video download on the mobile phone. The media server uses presence information to determine that it should deliver the video content to the laptop because the laptop has better video capabilities than the mobile phone.

SUMMARY

Some example embodiments include a method that includes connecting a communications device to an Internet Multimedia Subsystem network. The method includes transmitting presence information indicating multimedia capabilities of the communications device. The method includes requesting multimedia content from a multimedia server to cause the multimedia server to transmit multimedia content to the communications device according to the multimedia capabilities indicated in the presence information. The method includes detecting connection of a peripheral device to the communications device. The method includes determining that the multimedia capabilities have increased due to the connection of the peripheral device. The method includes updating the presence information to indicate the increased multimedia capabilities. The method includes transmitting the updated presence information to cause the multimedia server to transmit the multimedia content adjusted for the increased multimedia capabilities indicated in the updated presence information. The method includes receiving the multimedia content adjusted for the increased multimedia capabilities. The method includes presenting at least some of the adjusted multimedia content on the peripheral device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to IMS networks, embodiments may be implemented in other types of networks. In other instances, well-known instruction instances, protocols, structures, and techniques have not been shown in detail in order not to obfuscate the description.

Communication device capabilities may change during an established multimedia session due to connection of a peripheral device. For example, a user listens to an Internet radio service on a mobile phone through a set of headphones. Later, the user connects the mobile phone to stereo system in a car. The mobile phone can leverage the car's stereo system to present higher quality audio than it could present with the headphones. Functionality can be implemented in a communication device to detect connection of a peripheral device and determine multimedia capabilities of the peripheral device. The communication device updates its presence information to indicate the multimedia capabilities of the peripheral device. In response, a multimedia server determines multimedia capabilities indicated in the presence information have changed and optimizes delivery of multimedia content based on the updated multimedia capabilities.

Figure 1:
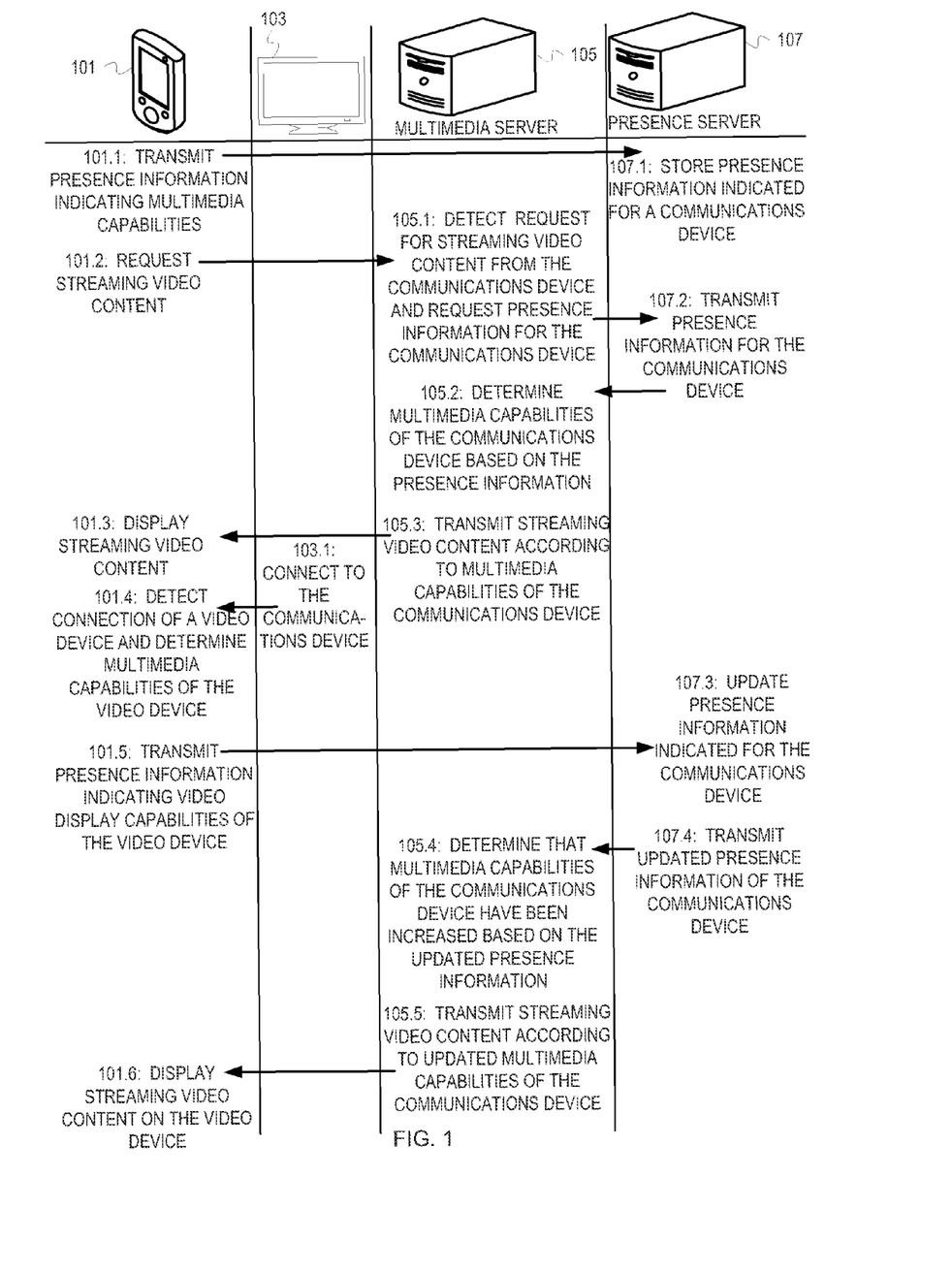
FIG. 1 is an example conceptual diagram of optimizing delivery of multimedia content based on presence information.

FIG. 1 is an example conceptual diagram of optimizing delivery of multimedia content based on presence information. At 101.1, a communications device 101 transmits presence information indicating its multimedia capabilities to a presence server 107.1. In this example, the communications device 101 is a portable media player (e.g., an iPod®, an mp3 player, etc.). Other examples of communications devices include mobile phones, personal digital assistants (PDAs), computers, etc. Multimedia capabilities may comprise supported audio and video codecs, maximum screen resolution, screen aspect ratio, number of audio channels, etc. In this example, the communications device 101 transmits presence information in a SIP registration request when it connects to an IMS network.

At 107.1, the presence server 107 stores the presence information for the communications device 101.

At 101.2, the communications device 101 requests streaming video content from a multimedia server 105. For example, the communications device 101 sends a SIP INVITE message to the multimedia server 105 indicating the desired streaming video content.

At 105.1, the multimedia server 105 detects the request for the streaming video content from the communications device 101 and requests the communications device's 101 presence information from the presence server 107. In this example, the multimedia server 105 subscribes to the communications device's 101 presence information to cause the presence server 107 to transmit the presence information to the multimedia server 105.

At 107.2, the presence server 107 transmits presence information for the communications device 101 to the multimedia server 105.

At 105.2, the multimedia server 105 receives the presence information for the communications device 101 and determines multimedia capabilities of the communications device 101 based on the presence information. In this example, the multimedia server 105 determines that the communications device 101 is capable of presenting Moving Pictures Expert Group-4 (MPEG-4) and Windows Media Video (WMV) formats at a resolution of 480×272 pixels.

At 105.3, the multimedia server 105 transmits the streaming video content according to multimedia capabilities of the communications device 101. In this example, the multimedia server 105 transmits the streaming video content in a WMV format at a resolution of 480×272 pixels.

At 101.3, the communications device 101 presents the streaming video content on its screen.

At 103.1, a video device 103 is connected to the communications device 101. The video device 103 may be connected to the communications 101 by any suitable wired or wireless connection technology (e.g., Universal Serial Bus (USB), 802.11, Bluetooth®, High-Definition Multimedia Interface (HDMI), etc.) In this example, the video device 103 is a high definition television. Other examples of video devices include computers, monitors, projectors, etc.

At 101.4, the communications device 101 detects connection of the video device 103 and determines the video device's 103 multimedia capabilities. In this example, the video device 103 is capable of presenting MPEG-2 formats at a resolution of 1820×720 pixels.

At 101.5, the communications device 101 transmits presence information indicating the multimedia capabilities of the video device 103.

At 107.3, the presence server 107 updates presence information for the communications device 101.

At 107.4, the presence server 107 transmits the communications device's 101 updated presence information to the multimedia sever 105. In this example, the presence server 107 transmits the updated presence information to the multimedia server 105, because the multimedia server 105 had previously subscribed to the presence information.

At 105.4, the multimedia server 105 determines that the communications device's 101 multimedia capabilities have been increased based on the updated presence information.

At 105.5, the multimedia server 105 transmits the streaming video content according to the updated multimedia capabilities of the communications device. In this example, the multimedia server 105 transmits the streaming video content in a MPEG-2 format at a resolution of 1820×720 pixels.

At 101.6, the communications device 101 displays the streaming video content on the video device 103. The communications device 101 can leverage the multimedia capabilities of the video device 103 to cause the multimedia server 105 to transmit streaming video content that the communications device 101 cannot present on its own.

Figure 2:
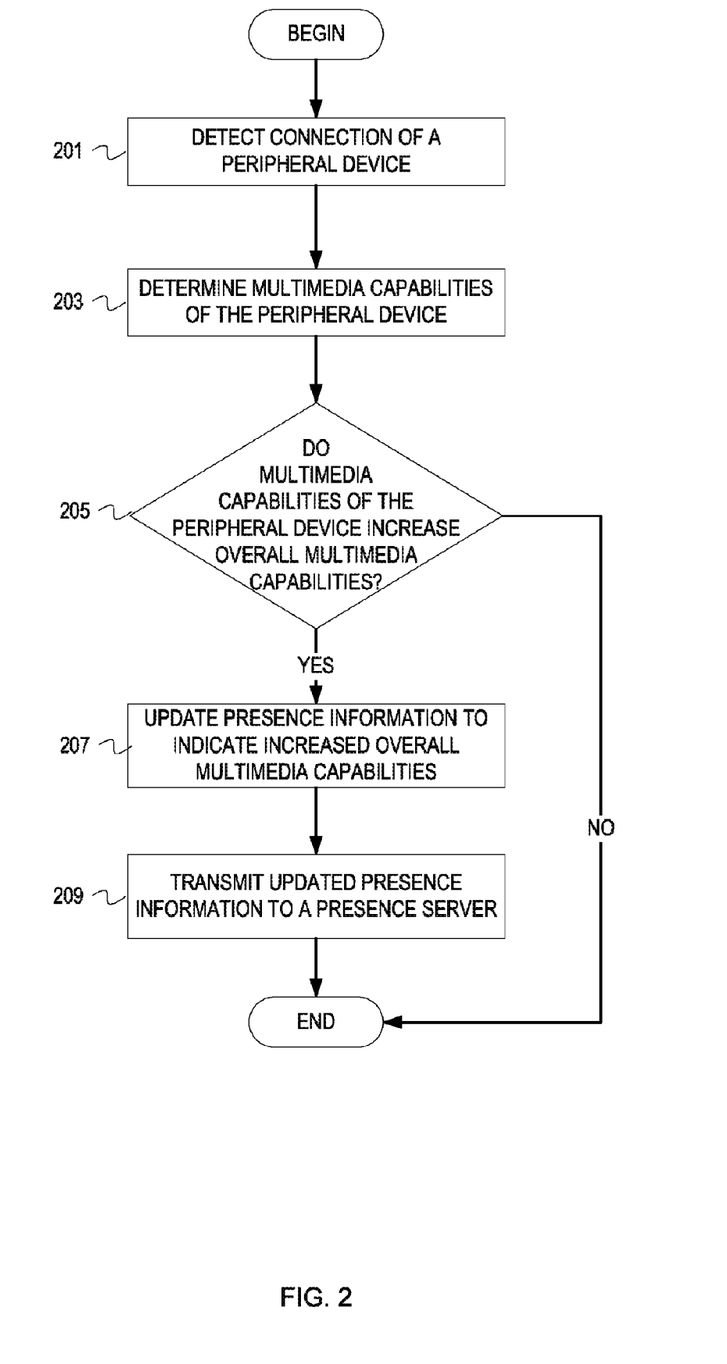
FIG. 2 is a flowchart depicting example operations for updating multimedia capabilities based on connection of a peripheral device.

FIG. 2 is a flowchart depicting example operations for updating multimedia capabilities based on connection of a peripheral device. Flow begins at block 201, where a communications device detects connection of a peripheral device. Examples of communications device include mobile phones, portable media players, PDAs, computers, etc. Examples of peripheral devices include televisions, monitors, speakers, stereo systems, etc. Flow continues at block 203.

At block 203, the communications device determines multimedia capabilities of the peripheral device. Multimedia capabilities may comprise supported audio and video codecs, supported image formats, supported document file types, maximum screen resolution, screen aspect ratio, number of audio channels, etc. Flow continues at block 205.

At block 205, the communications device determines if the peripheral device's multimedia capabilities increase its overall multimedia capabilities. For example, the peripheral device can be a set of speakers. The speakers can present audio over five channels. If the communications device can only present audio over two channels, the multimedia capabilities of the speakers increase the overall multimedia capabilities of the communications device. If the peripheral device's multimedia capabilities increase the overall multimedia capabilities of the communications device, flow continues at block 207. If the peripheral device's multimedia capabilities do not increase the overall multimedia capabilities of the communications device, flow ends.

At block 207, the communications device updates presence information to indicate the increased multimedia capabilities. Flow continues at block 209.

At block 209, the communications device transmits the updated presence information to a presence server and flow ends. For example, the communications device transmits a REGISTER message, indicating the increased multimedia capabilities, to the presence server. Leveraging the multimedia capabilities of the peripheral device allows the communications device to receive multimedia files that it is not able to present on its own.

While delivering multimedia content to a communications device, a multimedia server may detect that the communications device's multimedia capabilities have increased. In response, the multimedia server delivers the multimedia content at a higher quality based on the increased multimedia capabilities. For example, the communications device requests a download of an audio file. The multimedia server begins transmitting a low quality version of the audio file to the communications device based on the multimedia capabilities of the device indicated in the communications device's presence information. During the download, the communications device is connected to a stereo system or other peripheral device. The communications device updates its presence information to indicate increased multimedia capabilities of the stereo system. The multimedia server begins transmitting a high quality version of the audio file.

Figure 3:
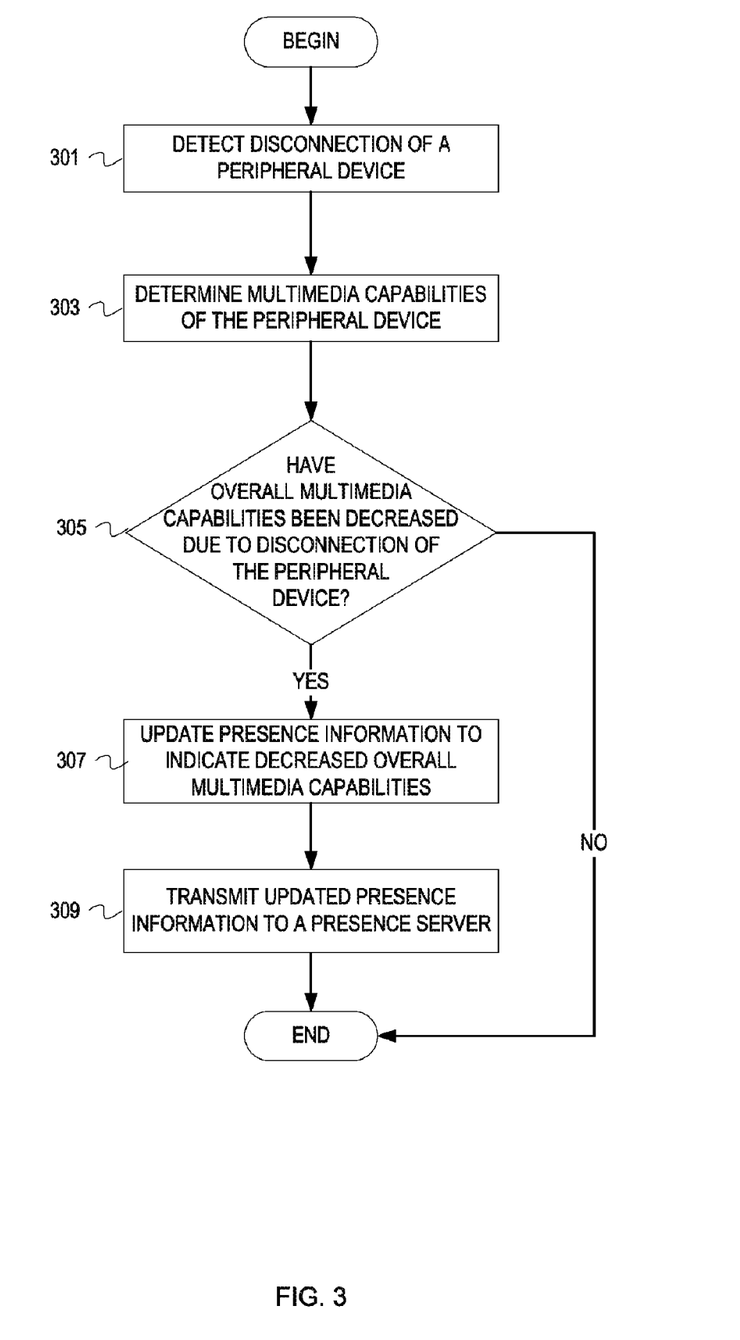
FIG. 3 is a flowchart depicting example operations for updating multimedia capabilities based on disconnection of a peripheral device.

When a peripheral device is disconnected from a communications device, the multimedia capabilities of the communications device may decrease. FIG. 3 is a flowchart depicting example operations for updating multimedia capabilities based on disconnection of a peripheral device. Flow begins at block 301, where a communications device detects disconnection of a peripheral device. For example, the communications device determines that a Bluetooth connection has been lost when the communications device is moved too far away from the peripheral device. Flow continues at block 303.

At block 303, the communications device determines the peripheral device's multimedia capabilities. For example, the communications device queries the peripheral device about its multimedia capabilities. Flow continues at block 305.

At block 305, the communications device determines if overall multimedia capabilities have been decreased due to disconnection of the peripheral device. For example, a portable media device is disconnected from a television. The television was capable of presenting high definition video. If the portable media device is not capable of presenting high definition video, the multimedia capabilities have been decreased. If the overall multimedia capabilities have been decreased due to the disconnection of the peripheral device, flow continues at block 307. If the overall multimedia capabilities have not been decreased due to the disconnection of the peripheral device, flow ends.

At block 307, the communications device updates presence information to indicate the decreased overall multimedia capabilities. Flow continues at block 309.

At block 309, the communications device transmits the updated presence information to a presence server and flow ends. For example, the communications device transmits a REGISTER message, indicating the decreased multimedia capabilities, to the presence server.

While delivering multimedia content to a communications device, a multimedia server may detect that the communications device's multimedia capabilities have decreased. In response, the multimedia server delivers the multimedia content at a lower quality based on the decreased multimedia capabilities. For example, a user is using a portable satellite radio receiver to listen to a satellite radio station in a car. The portable satellite radio receiver is connected to the car's high fidelity stereo system. A high quality version of the radio station content is being delivered to the portable satellite radio receiver based on its presence information indicating the multimedia capabilities of the car's stereo system. When the user arrives at work, he disconnects the satellite receiver from the car's stereo system and continues to listen to the radio station on speakers native to the receiver. The multimedia capabilities have decreased, so the portable satellite radio receiver updates its presence information to indicate the decreased multimedia capabilities. In response, a lower quality version of the radio station content is delivered to the portable satellite radio receiver.

Although examples refer to a communications device transmitting presence information to a presence server, embodiments are not so limited. The communications device may transmit presence information to a multimedia server when it establishes a connection to the multimedia server and when presence information changes. For example, the communications device transmits presence information to the multimedia server in an SIP INVITE message.

Although examples refer to a dynamically optimizing quality of multimedia files being delivered to a communications device based on a change in the communications device's multimedia capabilities, embodiments are not so limited. For example, a user wishes to listen to a new song released by their favorite artist while she is out for her morning jog. The user requests a download of the song on a mobile phone. Once the download completes, she is able to listen to the song using a set of earphones connected to the phone. The next day, the user wishes to play the song for a friend that has not heard it. She connects the mobile phone to a high fidelity stereo system. The mobile phone determines that the multimedia capabilities of the stereo system increase the overall multimedia capabilities of the mobile phone and updates the mobile phones presence information. When the user selects the song, the mobile phone requests another download of the song. In response, a higher quality version of the song is transmitted to the mobile phone.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
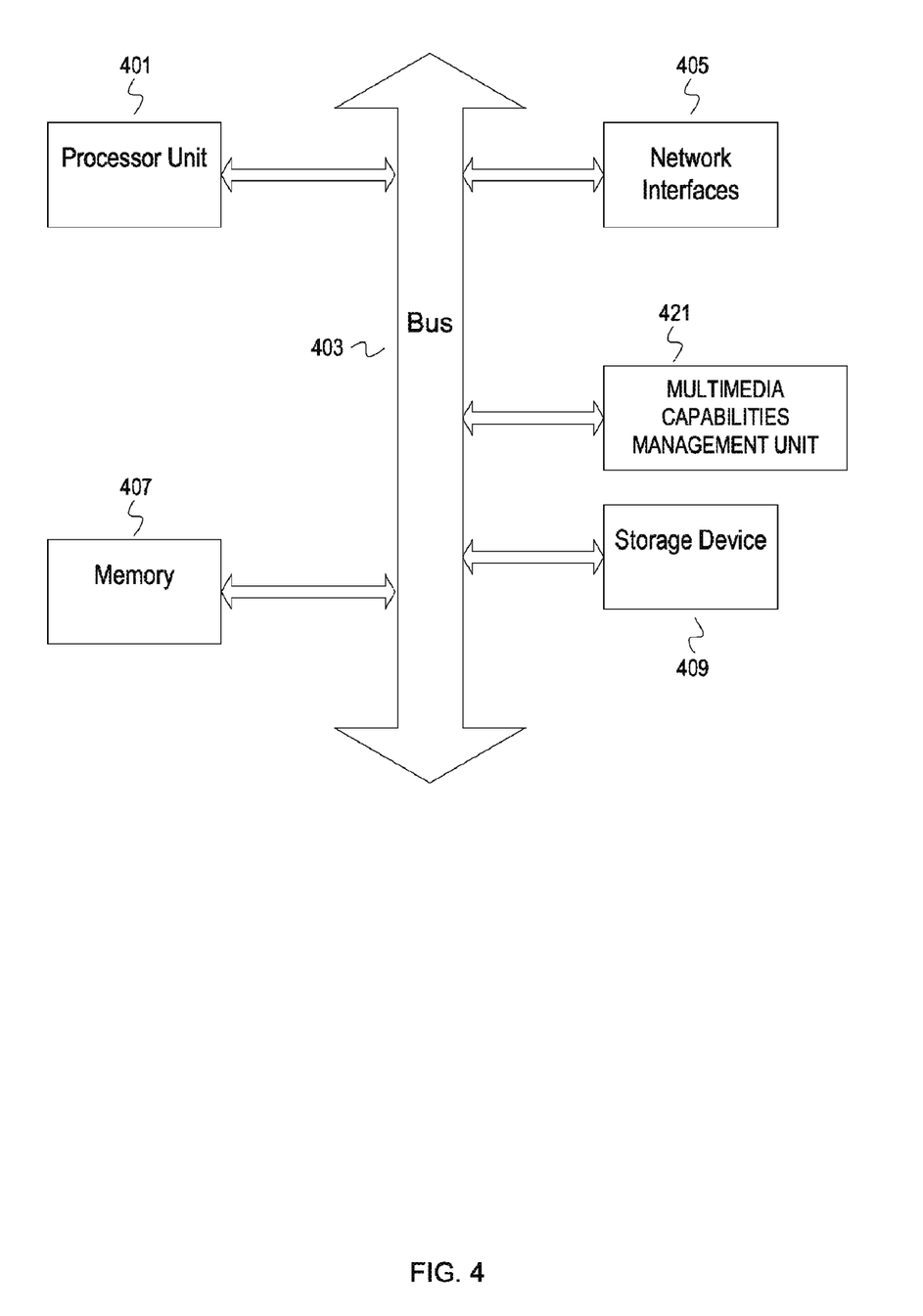
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system also includes a multimedia capabilities management unit 421. The multimedia capabilities management unit 421 detects connection of peripheral devices, determines if the overall multimedia capabilities are increased by the peripheral devices' multimedia capabilities, and updates presence information to indicate the multimedia capabilities of the peripheral devices. The multimedia capabilities management unit 421 also updates presence information to indicate a decrease in multimedia capabilities due to detecting disconnection of the peripheral devices. Although the multimedia capabilities management unit 421 is shown as a component connected to the bus 403, it can be implemented in any suitable fashion. For example, it may be partially (or entirely) implemented in hardware, software, and/or firmware. In some embodiments, the software can execute on the processing unit 401. In some embodiments, the functionality may be implemented with an application specific integrated circuit, in logic implemented in the processing unit 401, in a co-processor on a peripheral device or card, etc. Further, some embodiments may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for dynamically optimizing delivery of multimedia content over a network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   connecting a communications device to an Internet Multimedia Subsystem network, wherein the communications device comprises a mobile device that includes either a laptop computer and a mobile phone;
   transmitting presence information indicating multimedia capabilities of the communications device;
   requesting multimedia content from a multimedia server to cause the multimedia server to transmit multimedia content to the communications device according to the multimedia capabilities indicated in the presence information;
   detecting connection of a peripheral device to the communications device, wherein the peripheral device comprises a media device that includes a television, a monitor, a speaker, and a stereo system;
   determining that the multimedia capabilities have increased due to the connection of the peripheral device;
   updating the presence information to indicate the increased multimedia capabilities;
   transmitting the updated presence information to cause the multimedia server to transmit the multimedia content adjusted for the increased multimedia capabilities indicated in the updated presence information, wherein the increased multimedia capabilities are caused by the connection of the peripheral device to the communications device;
   receiving the multimedia content adjusted for the increased multimedia capabilities; and
   presenting at least some of the adjusted multimedia content on the peripheral device.

2. The method of claim 1, wherein the multimedia capabilities comprise, one or more of, supported audio and video codecs, supported image formats, supported document file types, maximum screen resolution, screen aspect ratio, and number of audio channels.

3. The method of claim 1, wherein said transmitting the presence information indicating the multimedia capabilities of the communications device further comprises sending a session initiation protocol REGISTER message.

4. The method of claim 1, wherein said detecting connection of the peripheral device to the communications device further comprises determining external multimedia capabilities of the peripheral device.

5. The method of claim 1 further comprising:
   detecting disconnection of the peripheral device;
   determining that the multimedia capabilities have decreased due to the disconnection of the peripheral device;
   updating the presence information to indicate the decreased multimedia capabilities; and
   transmitting the updated presence information to cause the multimedia server to transmit the multimedia content according to the decreased multimedia capabilities indicated in the updated presence information.

6. A method comprising:
   detecting connection of a peripheral device to a communications device, wherein the communications device comprises a mobile device that includes either a laptop computer and a mobile phone, and wherein the peripheral device comprises a media device that includes a television, a monitor, a speaker, and a stereo system;
   determining that the multimedia capabilities have increased due to the connection of the peripheral device;
   transmitting presence information indicating the increased multimedia capabilities of the communications device, wherein the increased multimedia capabilities are caused by the connection of the peripheral device to the communications device;
   requesting multimedia content from a multimedia server to cause the multimedia server to transmit multimedia content to the communications device according to the increased multimedia capabilities indicated in the presence information;
   detecting disconnection of the peripheral device from the communications device;
   determining that the multimedia capabilities have decreased due to the disconnection of the peripheral device;
   updating the presence information to indicate the decreased multimedia capabilities;
   transmitting the updated presence information to cause the multimedia server to transmit the multimedia content adjusted for the decreased multimedia capabilities indicated in the updated presence information, wherein the decreased multimedia capabilities are caused by the disconnection of the peripheral device to the communications device; and
   presenting the multimedia content on the communications device.

7. The method of claim 6, wherein said detecting disconnection of the peripheral device further comprises determining external multimedia capabilities of the peripheral device.

8. The method of claim 6, wherein said presenting the multimedia content on the communications device further comprises receiving the multimedia content adjusted for the increased multimedia capabilities.

9. A computer program product for dynamically optimizing delivery of multimedia content over a network, the computer program product comprising:
a non-transitory computer usable storage medium having computer usable program code embodied therewith, the computer usable program code comprising:
computer usable program code configured to,
connect a communications device to an Internet Multimedia Subsystem network, wherein the communications device comprises a mobile device that includes either a laptop computer and a mobile phone;
transmit presence information indicating multimedia capabilities of the communications device;
request multimedia content from a multimedia server to cause the multimedia server to transmit multimedia content to the communications device according to the multimedia capabilities indicated in the presence information;
detect connection of a peripheral device to the communications device, wherein the peripheral device comprises a media device that includes a television, a monitor, a speaker, and a stereo system;
determine that the multimedia capabilities have increased due to the connection of the peripheral device;
update the presence information to indicate the increased multimedia capabilities;
transmit the updated presence information to cause the multimedia server to transmit the multimedia content adjusted for the increased multimedia capabilities indicated in the updated presence information, wherein the increased multimedia capabilities are caused by the connection of the peripheral device to the communications device; and
present at least some of the adjusted multimedia content on the peripheral device.

10. The computer program product of claim 9, wherein the multimedia capabilities comprise, one or more of, supported audio and video codecs, supported image formats, supported document file types, maximum screen resolution, screen aspect ratio, and number of audio channels.

11. The computer program product of claim 9, wherein said computer usable program code being configured to transmit the presence information indicating the multimedia capabilities of the communications device comprises the computer usable code being configured to send a session initiation protocol REGISTER message.

12. The computer program product of claim 9, wherein said computer usable program code being configured to detect connection of the peripheral device to the communications device comprises the computer usable code being configured to determine external multimedia capabilities of the peripheral device.

13. The computer program product of claim 9, wherein said computer usable program code being configured to:
detect disconnection of the peripheral device;
determine that the multimedia capabilities have decreased due to the disconnection of the peripheral device;
update the presence information to indicate the decreased multimedia capabilities; and
transmit the updated presence information to cause the multimedia server to transmit the multimedia content according to the decreased multimedia capabilities indicated in the updated presence information.

14. The computer program product of claim 13, wherein said computer usable program code being configured to detect disconnection of the peripheral device comprises the computer usable code being configured to determine external multimedia capabilities of the peripheral device.

15. A computer program product for dynamically optimizing delivery of multimedia content over a network, the computer program product comprising:
a non-transitory computer usable storage medium having computer usable program code embodied therewith, the computer usable program code comprising:
computer usable program code configured to,
detect connection of a peripheral device from a communications device, wherein the communications device comprises a mobile device that includes either a laptop computer and a mobile phone, wherein the peripheral device comprises a media device that includes a television, a monitor, a speaker, and a stereo system;
determine that the multimedia capabilities have increased due to the connection of the peripheral device;
transmit presence information indicating the increased multimedia capabilities of the communications device;
request multimedia content from a multimedia server to cause the multimedia server to transmit multimedia content to the communications device according to the increased multimedia capabilities indicated in the presence information;
detect disconnection of the peripheral device;
determine that the multimedia capabilities have decreased due to the disconnection of the peripheral device;
update the presence information to indicate the decreased multimedia capabilities;
transmit the updated presence information to cause the multimedia server to transmit the multimedia content according to the decreased multimedia capabilities indicated in the updated presence information, wherein the decreased multimedia capabilities are caused by the disconnection of the peripheral device from the communications device; and
present the multimedia content on the communications device.

16. An apparatus comprising:
a set of one or more processors;
a network interface;
a multimedia capabilities management unit when executed by said set of one or more processor, operable to:
connect the apparatus to an Internet Multimedia Subsystem network, wherein the apparatus comprises a mobile device that includes either a laptop computer and a mobile phone;
transmit presence information indicating multimedia capabilities of the apparatus;
request multimedia content from a multimedia server to cause the multimedia server to transmit multimedia content to the communications device according to the multimedia capabilities indicated in the presence information;
detect connection of a peripheral device to the apparatus, wherein the peripheral device comprises a media device that includes a television, a monitor, a speaker, and a stereo system;
determine that the multimedia capabilities have increased due to the connection of the peripheral device;

update the presence information to indicate the increased multimedia capabilities; and transmit the updated presence information to cause the multimedia server to transmit the multimedia content according to the increased multimedia capabilities indicated in the updated presence information, wherein the increased multimedia capabilities are caused by the connection of the peripheral device to the apparatus.

17. The apparatus of claim 16, wherein said the multimedia capabilities management unit being operable to transmit the presence information indicating the multimedia capabilities of the communications device further comprises the multimedia capabilities management unit being operable to send a session initiation protocol REGISTER message.

18. The apparatus of claim 16, wherein said the multimedia capabilities management unit being operable to detect connection of the peripheral device further comprises the multimedia capabilities management unit being operable to determine external multimedia capabilities of the peripheral device.

19. The apparatus of claim 16 further comprises the multimedia capabilities management unit being operable to:

detect disconnection of the peripheral device;

determine that the multimedia capabilities have decreased due to the disconnection of the peripheral device;

update the presence information to indicate the decreased multimedia capabilities; and transmit the updated presence information to cause the multimedia server to transmit the multimedia content according to the decreased multimedia capabilities indicated in the updated presence information.

20. The apparatus of claim 19, wherein said the multimedia capabilities management unit being operable to detect disconnection of the peripheral device further comprises the multimedia capabilities management unit being operable to determine external multimedia capabilities of the peripheral device.

\* \* \* \* \*